United States Patent [19]

Ng et al.

[11] Patent Number: 4,965,774
[45] Date of Patent: Oct. 23, 1990

[54] METHOD AND SYSTEM FOR VERTICAL SEISMIC PROFILING BY MEASURING DRILLING VIBRATIONS

[75] Inventors: Fred W. Ng, Dallas; James P. DiSiena, Plano; Amjad A. Bseisu, Dallas, all of Tex.

[73] Assignee: Atlantic Richfield Company, Los Angeles, Calif.

[21] Appl. No.: 385,621

[22] Filed: Jul. 26, 1989

[51] Int. Cl.⁵ .................. B01V 1/40; E21B 47/022
[52] U.S. Cl. .................................. 367/75; 367/25; 367/40
[58] Field of Search .......... 175/40; 73/151; 367/25, 367/40, 58, 75, 911; 181/102, 106

[56] References Cited

U.S. PATENT DOCUMENTS

| | | | |
|---|---|---|---|
| 3,520,375 | 7/1970 | Raynal et al. | 175/40 |
| 3,714,822 | 2/1973 | Pau | 73/151 |
| 3,881,168 | 4/1975 | Farr et al. | 367/75 |
| 4,001,773 | 1/1977 | Lamel et al. | 367/75 |
| 4,207,619 | 6/1980 | Klaveness | 181/106 |
| 4,363,112 | 12/1982 | Widrow | 181/106 |
| 4,365,322 | 12/1982 | Widrow | 181/106 |
| 4,460,059 | 7/1984 | Katz | 181/102 |
| 4,715,451 | 12/1987 | Bseisu et al. | 175/40 |
| 4,718,048 | 1/1988 | Staron et al. | 367/40 |
| 4,821,563 | 4/1989 | Maron | 175/40 |

*Primary Examiner*—Nelson Moskowitz
*Attorney, Agent, or Firm*—Michael E. Martin

[57] ABSTRACT

Seismic measurements are taken during drilling operations by an array of seismometers placed on the earth's surface about the axis of a drillstring connected to a conventional drillbit and wherein the drillstring has an arrangement of strain gages and accelerometers mounted thereon in such a way as to measure axial and torsional vibrations of the drillstring. Signals indicating vibrations induced by the drillbit or another source and transmitted through the drillstring are compared with signals received by the seismometer array to determine the characteristics of the formation based on measurement of acoustic velocity from direct and reflected transmission of acoustic vibrations through the formation.

13 Claims, 3 Drawing Sheets

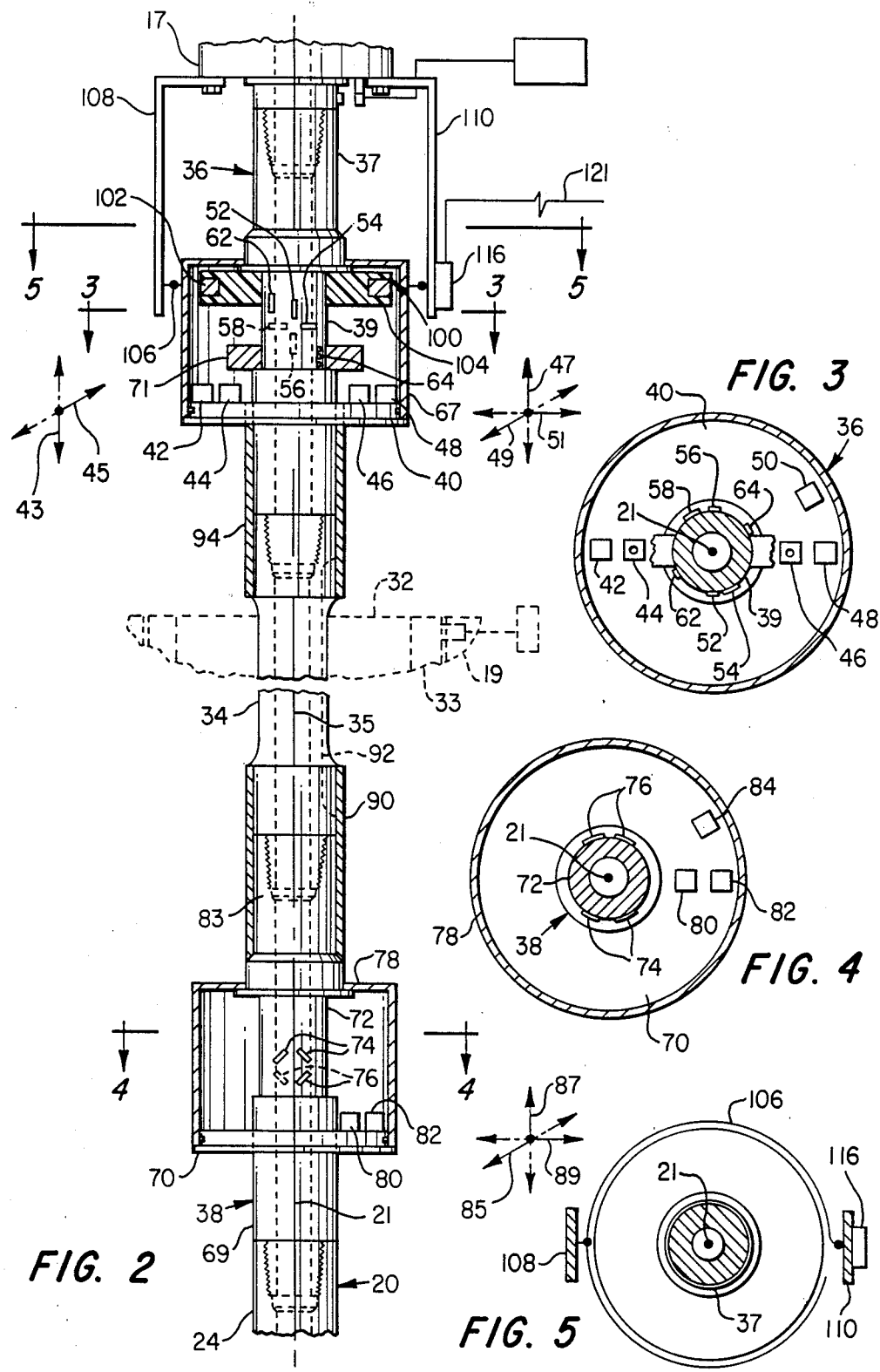

METHOD AND SYSTEM FOR VERTICAL SEISMIC PROFILING BY MEASURING DRILLING VIBRATIONS

BACKGROUND OF THE INVENTION

1. Field of the Invention

The present invention pertains to a method and system for obtaining seismic data pertaining to an earth formation by measuring certain vibrations generated by a drillbit or other device attached to a drillstring. Vibrations sensed by an array of seismic sensors on the earth's surface are compared with vibrations sensed by an arrangement of accelerometers and strain gages mounted at the upper end of the drillstring.

2. Background

U.S. Pat. No. 4,207,619 to A. Klaveness describes a technique wherein a pulse generator is attached to a drillstring and is used to generate seismic pulses at a selected depth in a wellbore, which pulses are measured as reflected and refracted vibrations by a series of seismometers mounted on the earth's surface. This technique, sometimes known as vertical seismic profiling, is considered useful in enabling the drilling operation to "look ahead" of the drillbit while drilling to gather information regarding the lithology of a formation in the vicinity of the wellbore.

The system described in the Klaveness patent does, however, require that the drilling operation be stopped while the seismic pulses are generated and measured by a sensor at the top of the drillstring as well as by the array of seismic sensors which detect the pulse signal which is transmitted as refracted and reflected acoustic or stress waves through the earth formation. Moreover, in the system described in the Klaveness patent only compressional seismic waves may be detected by the array and compared with the pulse generator output. It is also known to measure rock properties and drilling tool wear by sensing drillstem vibrations such as described in U.S. Pat. Nos. 3,520,375 to Raynal and 3,714,822 to Lutz.

However, with the development of the drillstring vibration measurement system described in U.S. Pat. No. 4,715,451 to A. A. Bseisu et al and assigned to the assignee of the present invention, an improved method of determining certain characteristics of an earth formation has been developed wherein the seismic signals generated by the drilling operation itself may be utilized in measuring the characteristics of a formation by the so called vertical seismic profiling technique. The improved system and method of the present invention has certain advantages which will be apparent to those skilled in the art upon reading the following summary and detailed description of the invention.

SUMMARY OF THE INVENTION

The present invention provides an improved method for measuring seismic signals transmitted through an earth formation for determining certain characteristics of the formation including its lithology.

In accordance with an important aspect of the present invention, a method is provided for measuring the travel time of acoustic pulses or vibrations in an earth formation wherein vibrations generated by a drillstring and bit while forming a drillhole are measured by seismometers mounted in a predetermined array on the earth's surface and these vibrations are compared with vibration signals transmitted along the drillstring and sensed by an improved system for measuring the drillstring vibrations. The method of the invention also provides for determining the location of the source of acoustic pulses or vibrations during the generation thereof.

The present invention also provides a unique system which includes an array of sensors which are capable of measuring cyclical tension and compression strains or vibrations in a drillstring as well as deflections caused by torsional vibrations of the drillstring, which vibrations are compared with vibrations sensed by an array of seismometers disposed in a predetermined pattern on the earth's surface. The utilization of the improved vibration or acoustic pulse sensing system of the invention may be carried out while actual drilling operations are in process, although the source of the acoustic vibrations may also be provided as a separate controllable device in the drillstring. The system of the present invention has the capability of measuring axial accelerations and strains, tangential and torsional strains and accelerations and radial accelerations. Accordingly, the sensors of the system are capable of providing signals which may be used individually or combined to indicate dynamic changes in drillstring vibratory conditions and comparing sensor outputs for reference purposes.

Still further advantages of the present invention, using the improved system for measuring drillstring vibrations, include the determination of an improved frequency bandwidth of the signals receivable and comparable by the seismometer array and the drillstring vibration measuring system, improved sensitivity which allows discrimination of drillstring induced vibrations from vibrations created on and around the drilling rig and comprising "noise" sources, improved signal discrimination at lower energy levels of the vibrations generated by the drillstring and determination of the actual time of the generation of the signal which is being measured by both the drillstring vibration measuring system and the seismometer array.

Other superior features and advantages of the invention will be apparent to those skilled in the art upon reading the following detailed description in conjunction with the drawings.

BRIEF DESCRIPTION OF THE DRAWING

FIG. 2 is a vertical section view illustrating details of the drillstring vibration measuring system;

FIG. 3 is a section view taken along the line 3—3 of FIG. 2;

FIG. 4 is a section view taken along the line 4—4 of FIG. 3;

FIG. 5 is a section view taken along the line 5—5 of FIG. 2; and

DESCRIPTION OF A PREFERRED EMBODIMENT

Figure 1:
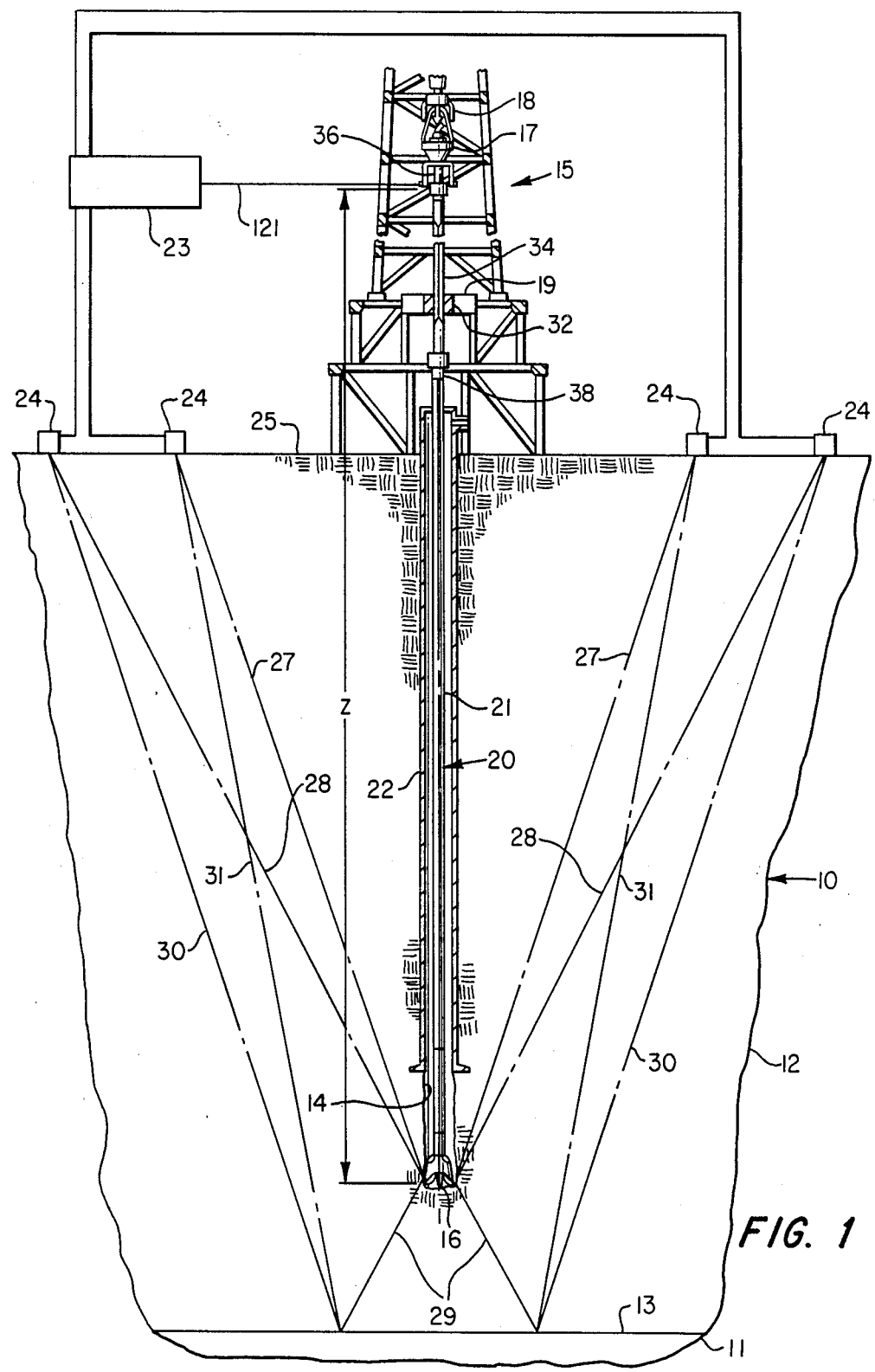
FIG. 1 is a vertical section view in somewhat schematic form of a wellbore being drilled while measuring and recording acoustic vibrations which are being transmitted through an earth formation and a drillstring.

In the description which follows like elements are marked throughout the specification and drawing with the same reference numerals, respectively. The drawing figures are not necessarily to scale and certain features are shown exaggerated in scale or in schematic form in the interest of clarity and conciseness.

Referring to FIG. 1, there is illustrated a portion of an earth formation 10 having at least one layer or stratum 11 which is different from another layer or stratum 12. The stratums 11 and 12 are generally separated from each other by an interface 13. The earth formation 10 is in the process of having a wellbore 14 formed therein by a conventional tri-cone or similar type drill bit 16 which is connected to the lower end of an elongated steel pipe type of drillstring 20. Other types of bits, not shown, may be used in place of the bit 16. The drillstring 20 is shown extending through a portion of the wellbore 14 which has been structurally stabilized with a casing 22. A conventional rotary type drill rig 15 is operable to drive the drillstring 20 through a conventional rotary table 19 which includes a drive bushing 32 drivably engaged with a modified drive member or kelly 34. The drillstring 20 is suspended from the drill rig 15 by way of a conventional hook 18 and swivel assembly 17. The swivel assembly 17 is connected to a special sub 36, which will be described in further detail herein and which, together with a second sub 38 interposed in the drillstring between the kelly 34 and the bit 16, is adapted to transmit signals corresponding to axial and torsional vibrations of the drillstring to a telemetry system which includes a cable connected to a suitable signal processing and comparator unit 23. The subs 36 and 38 may be formed integral with the kelly 34.

In accordance with the method of the present invention an array of seismometers 24 is positioned on the earth's surface 25 and is adapted to measure vibrations which occur essentially in a vertical direction or parallel to the longitudinal central axis 21 of the drillstring 20 as well as in a radial direction normal to the axis 21 and in a tangential direction with respect to a circle having its axis coincident with the axis 21. Accordingly, the seismometers 24 are capable of measuring vibrations which are essentially vertical with respect to the earth's surface 25, and parallel to the earth's surface in both a radial direction and a torsional or tangential direction with respect to the axis 21. The array of seismometers 24 is exemplary and additional seismometers may be placed along radial lines extending from the axis 21 in a predetermined concentric circular pattern similar to that described in the Klaveness patent.

Acoustic vibrations generated in the formation 12 as a result of the cutting action of the bit 16 radiate outward in a generally spherical pattern from the bit along paths 27 and 28 to the respective seismometers 24 of the array. These vibration signals also radiate along paths 29, are reflected off of interface 13 and travel along paths 30 and 31 to the seismometers. Output signals from the seismometers are directed to a signal processing and comparator unit 23 for comparison of the arrival times of the signals at the respective seismometers and measurement of the amplitude and configuration of the signal.

In accordance with the present invention it is contemplated that the vibrations generated by the bit 16 are sufficiently distinguishable by the seismometers 24 and by a system for sensing transmission of these vibrations along the drillstring 20 as to make discrete comparisons of the signals to determine their travel time from the bit 16 along direct and reflected paths for purposes of measuring the lithology of the earth formation 10. The accuracy and sensitivity of the measurement system for measuring the vibrations generated and transmitted along the drillstring 20 is sufficient by measuring only the action of the drill bit or possibly other purposely induced signals so as to provide an improved seismic signal pattern which may be analyzed to determine certain characteristics of the formation 10.

Referring now to FIG. 2, in particular, the assembly of the kelly 34 and the upper and lower subs 36 and 38, respectively, is illustrated in further detail. The kelly 34 is a conventional elongated tubular member having a portion 35 of polygonal cross-section for non-rotatable but axial movement relative to the drive bushing 32. The bushing 32 is typically removably disposed in a member 33 which is supported on suitable bearings, not shown, for rotation relative to the frame of the rotary table 19. Accordingly, the rotary table 19 is adapted to impart rotary motion to the drillstring 20 through the kelly but the kelly is disposed for axial movement relative to the rotary table as the bit penetrates the formation to form a wellbore. The kelly 34 is connected to the subs 36 and 38 through conventional threaded connections. The sub 36 is also threadedly connected to a sub forming part of the swivel 17 and mounted for rotation relative to the swivel frame on suitable bearing means, not shown.

The sub 36 is characterized by an elongated substantially tubular member 37 having a slightly reduced diameter tubular portion 39 and a first transversely extending, generally circular flange portion 40. The flange 40 is adapted to support a plurality of relatively sensitive accelerometers 42, 44, 46, 48 and 50, see FIG. 3 also. The specific location of these accelerometers is such that the axes of movement sensed by the accelerometers 42 and 44, 46, 48 and 50 are as indicated by vector diagrams to be described herein. The tubular portion 39 is adapted to have mounted on its exterior surface an arrangement of strain gages 52, 54, 56 and 58 which are of the electrical resistance type and preferably disposed in a conventional Wheatstone bridge type circuit. The gages 52, 54, 56 and 58 are adapted to measure axial elongation or compression of the portion 39 of the sub 36 and thus the axial strain on the drillstring 20. A second arrangement of strain gages comprise those mounted for axial elongation or compression with respect to the central longitudinal axis 21 of the drillstring and are characterized by gages 62 and 64 which are mounted on the cylindrical outer surface of the tubular portion 39 and are responsive to relatively high frequency axial deflections or waves which have been determined to travel along the outer surface of the drillstring 20. The gages 62 and 64 are diametrically opposed to each other and may be electrically connected in series or in a Wheatstone bridge configuration. The orientation of the gages on the sub 36 are indicated in FIG. 2 and their angular position about the longitudinal axis 21 is indicated in FIG. 3. A removable, nonmetallic cover 67 is disposed over the sensing elements on the sub 36, and a power source 71, such as a battery unit, may be mounted directly on the sub 36.

The vector diagrams associated with FIG. 2 indicate the directions of acceleration in each instance wherein a so-called positive acceleration signal is indicated by the respective accelerometers mounted on the flange 40. For example, the accelerometer 42 gives a positive acceleration signal in response to vertical downward movement as indicated by the vector 43. The accelerometer 44 gives a positive acceleration signal when moving tangentially in a direction indicated by the vector 45 in a clockwise direction about the axis 21, viewing FIG. 3. In like manner, the accelerometer 48 produces a positive output signal in response to axial movement in the direction of the vector 47, the accelerometer 46 produces a positive signal when moving in the director of the vector 49 about the axis 11 and the accelerometer 50 provides a positive signal when moving away from the axis 11 in the direction of the vector 51. The dashed vector lines in FIG. 2 extending in opposite directions with respect to each of the respective vectors aforementioned indicate the direction of movement of the respective accelerometers when a negative amplitude signal is produced by each accelerometer, respectively.

Referring further to FIG. 2 and also FIG. 4, the sub 38 is also characterized by a tubular portion 69 provided with a transverse cylindrical flange 70 and a reduced diameter section 72 on which opposed strain gages 74 and 76 are mounted for measuring deflection of the sub 38 under torsional vibration of the drillstring. The second set of strain gages 76 are mounted in a chevron or "V" configuration opposite the strain gage 74 and are preferable electrically interconnected in an appropriate bridge circuit. The transverse flange 70 is provided with a removable cover 78 for enclosing the strain gages 76 and 74 and for enclosing accelerometers 80, 82 and 84, FIG. 4, for measuring tangential, axial and radial accelerations of the sub 38, respectively. The vector diagram associated with the set of accelerometers 80, 82 and 84 indicates that a vector 85 is related to a positive signal generated by the accelerometer 80 in response to tangential movement of the sub 38 about the axis 21 whereas the vector 87 corresponds to a positive upward movement of the accelerometer 82 and a vector 89 corresponds to radial translation of the accelerometer 84 outwardly from the axis 21. The diameter of the flange 70 should be, of course, no greater than what would permit movement of the sub 38 through the opening provided for the bushing 32 in the table member 33.

The strain gages 74 and 76 and the accelerometers 80, 82 and 84 are provided with suitable signal conductors which are trained along a shank 83 of the sub 38 within a protective sleeve 90 and then through a longitudinal groove 92 which extends through the kelly 34 and along the outer surface of the sub 36, protected by a sleeve 94, and through a suitable passage in the flange 40 to a signal conditioning amplifier and radio transmitter unit, generally designated by the numeral 100. The transmitter unit 100 is provided with one or more FM radio transmitters 102 disposed on support means 104 and disposed for beaming output signals to a receiving antenna. The antenna may be remote from the drill rig 15 or an arrangement as illustrated may be provided comprising an antenna 106 mounted on a support characterized by opposed depending legs 108 and 110 which are secured to the swivel 17. The signals generated by the strain gages and accelerometers can be preprocessed, summed and scaled before transmission by the transmitter unit 100 to provide signals of higher dynamic range and sensitivity.

The antenna 106 is suitably connected to a receiver 116 which, in turn, is connected to the aforementioned signal transmitting cable 121 which transmits the signals generated by the strain gages and accelerometers by way of the transmitter unit 100 to the signal processing and comparator system 23. The comparator system 23 may include means for converting the signals to a form which may be analyzed by digital computer. In this way, certain kinds of computer processing may be carried out to determine particular vibration modes of the drillstring 20. Selected spectral analysis of the signals received by the various accelerometers and strain gages may be carried out to identify particular frequencies and signal characteristics. Such analysis is then correlated with measurements taken by the array of seismometers 24. Accordingly, with some level of interpretive skill, surface measurements taken by the system of the present invention can be used to identify certain earth formation characteristics, for example.

The output signals from the respective strain gages and accelerometers are described in some additional detail in U.S. Pat. No. 4,715,451. The particular type of telemetry sytem for transmitting signals from the drillstring 20 to a receiver such as the receiver 116 may, of course, be modified to use suitable hard wired signal transmitting devices or to provide microwave range radio frequency signals.

The signals generated by the respective accelerometers may be correlated to determine the mode of vibration of the drillstring 20 and on the basis of comparing certain vibrations, the speed of rotation of the bit 16 may be measured and the bit interaction with the formation being drilled may also be readily determined. Since this interacting effort may comprise repeated acoustic pulses being generated and transmitted through the formation 10, the originating time of a particular pulse transmitted through the drillstring 20 may be determined and compared with the arrival time of the same pulse at the seismometers 24 to determine certain characteristics of the formation. In utilizing the system described in conjunction with FIGS. 2 through 5, axial vibrations manifested by waves traveling along the surface of the drillstring 20 are typically measured by the strain gages 62 and 64 and torsional vibration waves also traveling along the surface of the drillstring are measured by the strain gages 74 and 76. Relatively large amplitude torsional vibrations may be detected by the accelerometers 44, 46 and 80. If the signal output from the accelerometers 44 and 46 are, for example, out of phase as indicated by the vectors 45 and 47, a torsional vibrating mode is being sensed. In like manner, if the signal output from the accelerometers 42, 48 and 82 are in phase, axial vibrations are occurring, and, if the signals being generated by the accelerometers 42 and 48 are out of phase, for example, a bending vibratory mode of the drillstring is being experienced.

The origin in time of an acoustic pulse resulting from interaction of the bit 16 with the formation 10, for example, may be determined and the acoustic pulse traveling up the drillstring 20 may be compared with the signal received by the respective seismometers 24 of the array illustrated in FIG. 1. For example, the location of interaction between the bit 16 and formation 10 may be determined by measuring torsional vibrations and axial vibrations which exhibit a particular relationship. Since the distance from the surface 25 to the bit 16 may be known, or readily determined, and the axial and torsional acoustic wave speed in the material of the drillstring 20 may be determined, the timing of the event which resulted in an acoustic pulse having a particular characteristic may be determined. For example, the longitudinal or axial wave speed and the torsional wave speed for a particular material such as steel may be determined if the modulus of elasticity and the density of the material are known. The equations for longitudinal and torsional wave speed in steel are described in a paper entitled: Detection of Various Drilling Phenomena Utilizing High Frequency Surface Measurements by A. A. Besaisow, et. al., SPE 14327, The Society of Petroleum Engineers, P.O. Box 833836, Richardson, Tex. 75083.

If the distance Z, FIG. 1, from the subs 36 or 38 to the bit 16 is known, then signals taken from either one of these subs indicating an axial mode of vibration or a torsional mode of vibration may be used to determine the origin in time of the signal which is being correlated with the signals received by the seismometers 24. Since the distance $Z=V_a \cdot t_a$ for axial vibration and the velocity $V_a$ of axial waves in steel may be determined, then the time $t_a$ may be determined from such an equation. In like manner, if the distance is to be determined from measuring a torsional signal and comparing that signal with that signal received by the array of seismometers 24 having a torsional characteristic then the time $t_o$ may be determined from the equation $Z=V_o \cdot t_o$. The characteristics of the signals received by the subs 36 and 38 may be related to signals received by the array of seismometers 24 using a cross-correlation technique. Such a technique, typically, involves selecting values of the respective signals at relatively small increments of time for axial or torsional signals sensed by the sensors on the sub 36 and compressional or shear wave signals sensed by the seismometers 24, respectively. At each time increment ($t_1$, $t_2$, $t_3$ ... ), an axial signal sensed by sensors on the sub 36 is compared with a compressional wave signal sensed by the seismometers 24. Alternatively, a torsional vibratory signal sensed by the sensors on the sub 36 may be compared with a shear or so called torsional wave signal sensed by the seismometers 24. The respective signal amplitudes or a related value, for each signal, are multiplied and summed to develop a cross-correlation signal. The incremental values are shifted in time and summed until a peak summation value is obtained as a function of the time shift and the time shift which corresponds to the peak value is determined to be the time difference between the arrival of the signal at the sub versus the arrival of the same signal at the array of seismometers 24.

Figure 6:
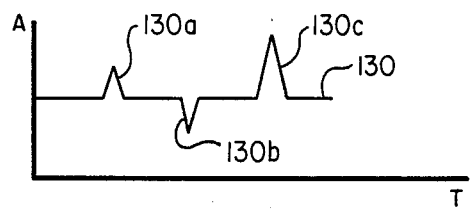
FIGS. 6 and 7 are diagrams showing signal characteristics of axial and torsional vibrations caused by the same event.
Figure 7:
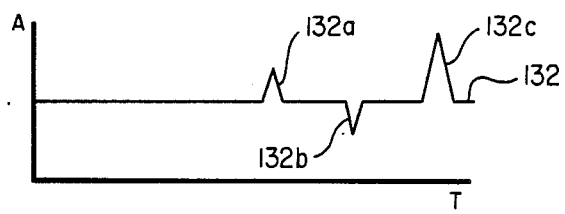

In some instances the exact location of the origin of the signal which is being measured by the subs 36 or 38 and by the array of seismometers 24 may not be known. However, signals received by the sensors on the subs 36 and 38 may be compared and cross-correlated to determine the location of the origin of the signal. Referring to FIGS. 6 and 7, for example, there is illustrated the characteristics of an exemplary signal. In FIG. 6 there is illustrated a signal which is sensed by the seismometers 44 and 46 indicating an axial vibration. The curve or signal characteristic 130 in FIG. 6 includes peaks 130a, 130b and 130c. By monitoring the torsional vibrations of the drillstring 20, signals with similar characteristics measured by the accelerometers 42 and 48 may be sensed and having a characteristic 132 as shown in FIG. 7. The correlation between the signals 130 and 132 is indicated by the peaks 132a, 132b and 132c which are of similar amplitude and shape as a function of time but are received by the accelerometers 42 and 48 at a later time than the signals received by the accelerometers 44 and 46 from the axial vibrations.

Accordingly, the cross-correlation technique may be utilized to compare the signals of FIGS. 6 and 7 to determine the difference in time between the arrival of the axially propogated signal at the sub 36 and the torsionally propogated signal at the same sub. The location of origin of the signal in the drillstring 20 may then be obtained from the equation:

$$Z = \frac{V_o \cdot V_a \cdot \Delta t}{\Delta V}$$

where $\Delta V = V_a - V_o$ and $\Delta t = t_o - t_a$

Since the cross-correlation technique may be used to determine the distance Z from the sub 36, or the sub 38, to the point of origin to the signal which is being measured, once this distance Z is known and the axial and torsional wave speed or acoustic velocities in the drillstring 20 are known, the origin in time of the signal being measured may be easily determined from the above equations.

The cross-correlation technique is not believed to require detailed discussion herein. Certain references which discuss basic cross-correlation analysis include the treatise entitled "Random Data Analysis and Measurement Procedures", Second edition, J. S. Bendat and A. G. Piersol, John Wiley & Sons, New York, 1986. For relatively low frequency signals of less than about 100 Hz, the so-called impulse response function may yield a better or more accurate definition of the time delay between receipt of the signals at the subs 36 or 38 and also at the array of seismometers 24. Unit impulse response measurements are discussed in the publication entitled "Engineering Applications of Correlation and Spectral Analysis" by J. S. Bendat and A. G. Piersol, John Wiley & Sons, New York, 1980.

Accordingly, the determination of the time of origin of an acoustic signal generated by rotation or impacting of the bit 16, or another source in the vicinity of the bit 16 which is capable of transmitting acoustic pulses through the drillstring 20 as well as the formation 10, significantly improves the determination of the characteristics of the formation without interrupting the drilling operation.

Moreover, the vibration measurement system described herein is capable of improving the frequency bandwidth of usable signals and resolution of signals which are capable of determining formation characteristics. The system described herein also allows easier distinction of impact vibrations versus continuous wave type vibrations for greater accuracy in determining the time of origination of an acoustic signal and provides for multisignal references of both a compressional or shear type whereby both compressional acoustic pulses and shear acoustic pulses may be measured by the seismometers 24. For example, a torsional vibration induced by the turning of the bit 16 is transmitted up the drillstring and measured by the accelerometers 44 and 46 while at the same time a torsional wave is transmitted through the formation 10 and is measured by a combination of opposed seismometers 24 which are disposed on either side of the axis 21. Accordingly, the shear velocity of the formation region in question may be determined as well as the compressional wave velocity.

The assumption that acoustic waveforms created by vibration of the bit 16 or interaction of the drillstring 20 with the wellbore 14, for example, are not significantly altered as they travel along the drillstring relies on the premise that there is little effect on the signals due to response of the drillstring itself. This assumption may be relatively accurate for vibrations in the range of 0–100 Hz. However, for vibrations above about 100 Hz reflections of stress waves are created at joints in the drillstring which may alter the signal waveforms read by the sensors on the subs 36 and 38. The result of this phenomenon is to prohibt the transmission of signals in certain frequency bands and to significantly change signal patterns. However, a deconvolution process may be used to remove the effect of the altered waveforms due to the presence of joints or couplings in the drillstring 20, for example, or other structural features of the drillstring which tend to distort the waveforms travelling along the drillstring. The deconvolution process does require predicting the response of the drillstring 20 to the signals caused by vibration of the bit 16, for example, and then subtracting the effects of the drillstring response from the measured signals at the sensors on the subs 36 and 38. Deconvolution processes are discussed in Seismic Data Processing, Ozdogan Yilmaz, Society of Exploration Geophysicists, Tulsa, Okla., 1987.

Thanks to the provision of plural sensors on the drillstring itself, descriminative analysis of signals generated by the respective sensors can be obtained and allow for adaptive filtering and improved deconvolution processes to eliminate spurious signals or "noise". Moreover, the unique arrangement of the sensor subs in the drillstring provides improved signal sensitivity without interfering with the drilling process.

Although a preferred embodiment of an approved method and system in accordance with the present invention has been described detail herein, those skilled in the art will recognize that various substitutions and modifications may be made without departing from the scope and the spirit of the invention as recited in the appended claims.

What is claimed is:

1. A method for obtaining seismic data pertaining to an earth formation while forming a wellbore in said formation with a drillstring having a drillbit or the like disposed at the lower distal end thereof, said method comprising the steps of:
   providing vibration sensing means connected to an upper region of said drillstring, said vibration sensing means being adapted to produce electrical signals related to vibrations of said drillstring;
   providing an array of seismometers disposed generally on the earth's surface in the vicinity of said wellbore;
   measuring first signals generated by said vibration sensing means resulting from vibrations of said drillstring;
   measuring second signals generated by said array of seismometers resulting from vibrations transmitted through said formation; and
   comparing said first signals and said second signals to determine selected characteristics of said formation including the step of calculating the location of origin of said first signal based on the difference in time of arrival at said vibration sensing means of a torsional vibration signal and an axial vibration signal transmitted through said drillstring and at least one of the torsional wave speed and the axial wave speed in said drillstring to determine the origin in time of said first signal.

2. The method set forth in claim 1 wherein: the location of origin of said first signal is determined by the equation:

$$Z = \frac{V_a \cdot V_o \cdot \Delta t}{\Delta V}$$

where Z is the distance from the point of origin of said first signal to said vibration sensing means, $V_a$ is the axial wave speed in said drillstring, $V_o$ is the torsional wave speed in said drillstring, $\Delta t$ is the difference in time of arrival at said vibration sensing means of a torsionally propogated signal and an axially propogate signal through said drillstring induced by said vibration and $\Delta V$ is $V_a - V_o$.

3. The method set forth in claim 1 wherein: said difference in time is determined by cross correlation of said torsional and axial vibration signals.

4. The method set forth in claim 1 wherein: said vibrations measured by said first and second signals are those generated by interaction of a part of said drillstring with said formation.

5. The method set forth in claim 4 wherein: said vibrations measured by said first and second signals are those generated by interaction of said drillbit with said formation.

6. A method for obtaining seismic data pertaining to an earth formation having a wellbore penetrating said formation with a drillstring disposed therein, said method comprising the steps of:
   providing means associated with said drillstring for generating vibrations for transmission through said drillstring and said formation during drilling operations;
   providing vibration sensing means connecting to an upper region of said drillstring, said vibration sensing means being adapted to produce electrical signals related to vibrations of said drillstring;
   providing an array of seismometers disposed generally on the earth's surface in the vicinity of said wellbore;
   measuring first signals generated by said vibration sensing means resulting from vibrations of said drillstring;
   determining the origin in time of said first signals including the step of calculating the location of origin of said first signals based on the difference in time of arrival at said vibration sensing means of a torsional vibration signal and an axial vibration signal transmitted through said drillstring and at least one of the torsional wave speed and the axial wave speed in said drillstring;
   measuring second signals generated by said array or seismometers resulting from vibrations transmitted through said formation and generated by said means for generating vibrations; and
   comparing said first signals and said second signals.

7. The method set forth in claim 6 wherein: the location of origin of said first signal is determined by the equation:

$$Z = \frac{V_a \cdot V_o \cdot \Delta t}{\Delta V}$$

wherein Z is the distance from the point of origin of said first signal to said vibration sensing means, $V_a$ is the axial wave speed in said drillstring, $V_o$ is the torsional wave speed in said drillstring, $\Delta t$ is the difference in time of arrival at said vibration sensing means of a torsionally propagated signal and an axially propogated signal through said drillstring induced by said vibration and $\Delta V$ is $V_a - V_o$.

8. A method for obtaining seismic data pertaining to an earth formation while forming a wellbore in said formation with a drillstring having a drillbit or the like disposed at the lower distal end thereof, said method comprising the steps of:

providing vibration sensing means connected to an upper region of said drillstring and adapted to produce electrical signals related to vibrations of said drillstring, said vibration sensing means comprising at least a first accelerometer spaced from the longitudinal axis of said drillstring for producing signals of positive and negative amplitude in response to torsional oscillation of said drillstring and at least a second accelerometer on said drillstring spaced apart from said first accelerometer;

providing an array of seismometers disposed generally on the earth's surface in the vicinity of said wellbore including at least a first seismometer and a second seismometer spaced apart from each other and from said longitudinal axis;

measuring signals generated by said first and second accelerometers resulting from vibrations of said drillstring;

comparing the signals generated by said first and second accelerometers to determine a torsional mode of vibration of said drillstring;

measuring signals generated by said array of seismometers resulting from vibrations transmitted through said formation; and comparing signals generated by said first and second accelerometers with signals generated by said first and second seismometers to determine the shear wave velocity of said formation.

9. A method for obtaining seismic data pertaining to an earth formation having a wellbore penetrating said formation will a drillstring disposed therein, said drillstring including a wellbore forming bit disposed at a distal end thereof, said method comprising the steps of:

providing a sub connected to and forming a part of said drillstring, said sub including a plurality of sensors disposed thereon, said plurality of sensors being operable to determine an axial mode of vibration of said drillstring and a torsional mode of vibration of said drillstring generated by drilling operations with said drillstring;

providing an array of seismometers disposed generally on the earth's surface in the vicinity of said wellbore and spaced apart with respect to each other and with respect to a longitudinal central axis of said wellbore;

measuring first signals generated by selected ones of said plurality of sensors to determine an axial mode of vibration and a torsional mode of vibration of said drillstring, respectively;

measuring second signals generated by said array of seismometers resulting from vibrations transmitted through said formation and generated by said drilling operations;

determining the difference in time of arrival at said sensors of a torsional vibration signal and an axial vibration signal transmitted through said drillstring;

determining the torsional wave speed and the axial wave speed in said drillstring;

calculating the location of origin of said first signals based on said difference in time and said wave speeds, respectively;

determining the origin in time of selected ones of said first signals based on said location of origin and one of said wave speeds; and comparing said first signals and said second signals.

10. The method set forth in claim 9 including the step of:

transmitting said first signals to comparison means for comparing said first signals and said second signals by wireless transmission from said sub to said comparison means.

11. The method set forth in claim 9 including the steps of:

comparing selected ones of said first signals with each other to determine at least one of a mode of vibration of said drillstring and elimination of spurious signals.

12. The method set forth in claim 9 wherein:

the step of calculating the location of origin of said first signal is carried out with the equation:

$$Z = \frac{V_a \cdot V_o \cdot \Delta t}{\Delta V}$$

where Z is the distance from the point of origin of said first signal to said vibration sensing means, $V_a$ is the axial wave speed in said drillstring, $V_o$ is the torsional wave speed in said drillstring, $\Delta t$ is the difference in time of arrival at said vibration sensing means of a torsionally propogated signal and an axially propogated signal through said drillstring induced by said vibration and $\Delta V$ is $V_a - V_o$.

13. The method set forth in claim 12 wherein:

said difference in time of arrival is determined by cross correlation of said torsionally propogated signal and said axially propogated signal.

* * * * *